US012707262B2

(12) United States Patent
Nair et al.

(10) Patent No.: US 12,707,262 B2
(45) **Date of Patent: *Aug. 11, 2026**

(54) METHOD, APPARATUS, AND COMPUTER PROGRAM PRODUCT FOR AUTHENTICATION USING A USER EQUIPMENT IDENTIFIER

(71) Applicant: NOKIA TECHNOLOGIES OY, Espoo (FI)

(72) Inventors: Suresh Nair, Whippany, NJ (US); Ranganathan Mavureddi Dhanasekaran, Munich (DE); Laurent Thiebaut, Antony (FR)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 19/012,615

(22) Filed: Jan. 7, 2025

(65) Prior Publication Data

US 2025/0142331 A1 May 1, 2025

Related U.S. Application Data

(63) Continuation of application No. 17/865,160, filed on Jul. 14, 2022.

(Continued)

(51) Int. Cl.

*H04W 8/18* (2009.01)
*H04W 12/041* (2021.01)

(Continued)

(52) U.S. Cl.

CPC ......... *H04W 12/06* (2013.01); *H04W 12/041* (2021.01); *H04W 12/72* (2021.01)

(58) Field of Classification Search

CPC ... H04W 12/06; H04W 12/72; H04W 12/041; H04W 12/043; H04W 12/0471

(Continued)

(56) References Cited

U.S. PATENT DOCUMENTS

| | | | |
|---|---|---|---|
| 2014/0185603 A1 | 7/2014 | Kaippallimalil et al. | |
| 2019/0215691 A1* | 7/2019 | Salkintzis | H04W 12/069 |

(Continued)

FOREIGN PATENT DOCUMENTS

| | | |
|---|---|---|
| WO | WO 2022/127791 A1 | 6/2022 |
| WO | WO 2022/127792 A1 | 6/2022 |

OTHER PUBLICATIONS

IP.com search history (Year: 2025).*

(Continued)

*Primary Examiner* — Moustapha Diaby

(74) *Attorney, Agent, or Firm* — ALSTON & BIRD LLP

(57) ABSTRACT

Methods, computer program products, and apparatuses are provided for enabling a user equipment (UE) to connect to the wireless access network that support non-seamless wireless local area network (WLAN) offload (NSWO), such as using the UE's fifth generation (5G) credentials. An apparatus may include a processor and a memory storing computer program code configured to cause the apparatus to request, by the UE, a wireless connection to a network entity; receive, by the UE, from the network entity, an identity request; and in response to the identity request, cause transmission, by the UE, an identity response including a UE identifier to the network entity such that the UE is configured to establish a security context with the network entity upon successful authentication using the UE identifier.

24 Claims, 11 Drawing Sheets

Related U.S. Application Data

(60) Provisional application No. 63/223,461, filed on Jul. 19, 2021.

(51) Int. Cl.
*H04W 12/06* (2021.01)
*H04W 12/08* (2021.01)
*H04W 12/12* (2021.01)
*H04W 12/72* (2021.01)
*H04W 88/02* (2009.01)

(58) Field of Classification Search
USPC .......................................................... 455/411
See application file for complete search history.

(56) References Cited

U.S. PATENT DOCUMENTS

| | | | | |
|---|---|---|---|---|
| 2020/0275279 | A1* | 8/2020 | Tangudu | H04W 12/068 |
| 2021/0185532 | A1 | 6/2021 | Salkintzis | |
| 2023/0262463 | A1* | 8/2023 | Kunz | H04L 63/1475 455/410 |

OTHER PUBLICATIONS

ProQuest search history (Year: 2025).*
U.S. Appl. No. 17/865,160, filed Jul. 14, 2022, US-2023/0016347 A1.
"3rd Generation Partnership Project; Technical Specification Group Core Network and Terminals; Evolved Packet System (EPS); 3GPP EPS AAA interfaces (Release 17)", 3GPP TS 29.273 v17.0.0, (Mar. 2021), 201 pages.
"3rd Generation Partnership Project; Technical Specification Group Core Network and Terminals; Non-Access-Stratum (NAS) protocol for 5G System (5GS); Stage 3; (Release 17)", 3GPP TS 24.501 v17.2.1, (Apr. 2021), 758 pages.
"3rd Generation Partnership Project; Technical Specification Group Services and System Aspects; 3GPP System Architecture Evolution (SAE); Security aspects of non-3GPP accesses (Release 16)", 3GPP TS 33.402 v16.0.0, (Jul. 2020), 72 pages.
"3rd Generation Partnership Project; Technical Specification Group Services and System Aspects; Architecture enhancements for non-3GPP accesses (Release 17)", 3GPP TS 23.402 v17.0.0, (Mar. 2021), 314 pages.
"3rd Generation Partnership Project; Technical Specification Group Services and System Aspects; Security architecture and procedures for 5G system (Release 17)", 3GPP TS 33.501 v17.2.1, (Jun. 2021), 257 pages.
"3rd Generation Partnership Project; Technical Specification Group Services and System Aspects; Study on non-seamless WLAN Offload in 5GS using 3GPP credentials; (Release 17)", 3GPP TR 33.881 v0.1.0, (May 2021), 8 pages.
AT&T et al., "New SID on Non-Seamless WLAN Offload in 5GC Using 3GPP Credentials", 3GPP TSG-SA Meeting #91-e, SP-210262, (Mar. 18-29, 2021), 3 pages.
Final Office Action for U.S. Appl. No. 17/865,160 dated Jan. 8, 2025.
International Search Report and Written Opinion for Patent Cooperation Treaty Application No. PCT/EP2022/070021 dated Oct. 27, 2022, 17 pages.
Lenovo et al., "Solution on NSWO Authentication", 3GPP TSG-SA3 Meeting #103-e, S3-212113, (May 17-28, 2021), 3 pages.
Non-Final Office Action for U.S. Appl. No. 17/865,160 dated Sep. 5, 2024.
Notice of Allowance for Taiwanese Application No. 111126976 dated Oct. 27, 2023, 3 pages.
Office Action for Taiwanese Application No. 111126976 dated Apr. 7, 2023, 24 pages.
Non-Final Rejection Mailed on Apr. 23, 2025 for U.S. Appl. No. 17/865,160, 22 page(s).
Final Rejection Mailed on Sep. 11, 2025 for U.S. Appl. No. 17/865,160, 10 page(s).
Notice of Allowance and Fees Due (PTOL-85) Mailed on Dec. 2, 2025 for U.S. Appl. No. 17/865,160, 9 page(s).
Non-Final Rejection Mailed on Mar. 11, 2026 for U.S. Appl. No. 17/865,160, 9 page(s).
Notice of Allowance and Fees Due (PTOL-85) Mailed on Jan. 23, 2026 for U.S. Appl. No. 17/865,160, 2 page(s).

* cited by examiner

METHOD, APPARATUS, AND COMPUTER PROGRAM PRODUCT FOR AUTHENTICATION USING A USER EQUIPMENT IDENTIFIER

CROSS-REFERENCE TO RELATED APPLICATIONS

This application is a continuation of U.S. application Ser. No. 17/865,160, filed Jul. 14, 2022, which claims priority to U.S. Provisional Application No. 63/223,461, filed Jul. 19, 2021, the entire contents of which are incorporated herein by reference.

TECHNOLOGICAL FIELD

An example embodiment relates generally to authentication using a user equipment (UE) identifier, such as non-seamless wireless offload (NSWO) authentication.

BACKGROUND

Telecommunication networks, such as 5G networks bring many improvements in the mobile network user experience. For instance, 5G networks should provide new technical solutions allowing a greater throughput, lower latency, higher reliability, higher connectivity, and higher mobility range. As the cellular system including 5G networks support an increasing number of UEs and services including applications with a wide range of use cases and diverse needs with respect to bandwidth, latency, and reliability requirements, the cellular system may need to enable UEs to connect to the wireless access network that support NSWO using the UEs' 5G credentials.

BRIEF SUMMARY

In some example embodiments, a method is provided comprising requesting, by a user equipment (UE), a wireless connection to a network entity, receiving, by the UE, from the network entity, an identity request, and in response to the identity request, causing transmission, by the UE, of an identity response comprising a UE identifier to the network entity such that the UE is configured to establish a security context with the network entity upon successful authentication using the UE identifier.

In some embodiments, a method is provided comprising receiving, at a network entity, a request from a user equipment (UE) for a wireless connection to the network entity, causing transmission, by the network entity, to the UE, of an identity request, and in response to the identity request, receiving, at the network entity, from the UE, an identity response comprising a UE identifier such that the network entity is configured to establish a security context with the UE upon successful authentication using the UE identifier.

In some embodiments, a method is provided for receiving, at a network function, a request for a wireless connection from a user equipment (UE) to a network entity, receiving, by the network function, from the network entity, a UE identifier, causing transmission, by the network function, to an authentication function, of the UE identifier and a wireless connection indicator, and upon successful authentication using the UE identifier, storing, by the network function, a permanent UE identifier received from the authentication function, and sending a master key received from the authentication function to the network entity.

In some embodiment, a method is provided for receiving, at an authenticator function, from a network function, an authentication request comprising a user equipment (UE) identifier and a wireless connection indicator, causing transmission, by the authenticator function, to a unified data management (UDM), of an authentication request comprising the UE identifier and a wireless connection indicator, receiving, at the authenticator function, from the UDM, an authentication response comprising a permanent UE identifier and an authentication vector, and storing one or more parameters of the authentication vector for future authentication.

In some embodiment, an apparatus is provided comprising at least one processor and at least one memory including computer program code, the at least one memory and the computer program code configured to, with the at least one processor, cause the apparatus to at least: request, by a user equipment (UE), a wireless connection to a network entity, receive, by the UE, from the network entity, an identity request, and in response to the identity request, cause transmission, by the UE, of an identity response comprising a UE identifier to the network entity such that the UE is configured to establish a security context with the network entity upon successful authentication using the UE identifier.

In some embodiment, an apparatus is provided comprising at least one processor and at least one memory including computer program code, the at least one memory and the computer program code configured to, with the at least one processor, cause the apparatus to at least: receive, at a network entity, a request from a user equipment (UE) for a wireless connection to the network entity, cause transmission, by the network entity, to the UE, of an identity request, and in response to the identity request, receive, at the network entity, from the UE, an identity response comprising a UE identifier such that the network entity is configured to establish a security context with the UE upon successful authentication using the UE identifier.

In some embodiment, an apparatus is provided comprising at least one processor and at least one memory including computer program code, the at least one memory and the computer program code configured to, with the at least one processor, cause the apparatus to at least: receive, at a network function, a request for a wireless connection from a user equipment (UE) to a network entity, receive, by the network function, from the network entity, a UE identifier, cause transmission, by the network function, to an authentication function, of the UE identifier and a wireless connection indicator, and upon successful authentication using the UE identifier, store, by the network function, a permanent UE identifier received from the authentication function, and send a master key received from the authentication function to the network entity.

In some embodiment, an apparatus is provided comprising at least one processor and at least one memory including computer program code, the at least one memory and the computer program code configured to, with the at least one processor, cause the apparatus to at least: receive, at the authenticator function, from a network function, an authentication request comprising a user equipment (UE) identifier and a wireless connection indicator, cause transmission, by the authenticator function, of an unified data management (UDM), the authentication request comprising the UE identifier and a wireless connection indicator, receive, at the authenticator function, from the UDM, an authentication response comprising a permanent UE identifier and an authentication vector, and store one or more parameters of the authentication vector for future authentication.

In some example embodiments, an apparatus is provided comprising means for requesting, by a user equipment (UE), a wireless connection to a network entity, means for receiving, by the UE, from the network entity, an identity request, and in response to the identity request, means for causing transmission, by the UE, of an identity response comprising a UE identifier to the network entity such that the UE is configured to establish a security context with the network entity upon successful authentication using the UE identifier.

In some embodiments, an apparatus is provided comprising means for receiving, at a network entity, a request from a user equipment (UE) for a wireless connection to the network entity, means for causing transmission, by the network entity, to the UE, of an identity request, and in response to the identity request, means for receiving, at the network entity, from the UE, an identity response comprising a UE identifier such that the network entity is configured to establish a security context with the UE upon successful authentication using the UE identifier.

In some embodiments, an apparatus is comprising means for receiving, at a network function, a request for a wireless connection from a user equipment (UE) to a network entity, means for receiving, by the network function, from the network entity, a UE identifier, means for causing transmission, by the network function, to an authentication function, of the UE identifier and a wireless connection indicator, and upon successful authentication using the UE identifier, means for storing, by the network function, a permanent UE identifier received from the authentication function, and means for sending a master key received from the authentication function to the network entity.

In some embodiment, an apparatus is provided comprising means for receiving, at an authenticator function, from a network function, an authentication request comprising a user equipment (UE) identifier and a wireless connection indicator, means for causing transmission, by the authenticator function, to a unified data management (UDM), of an authentication request comprising the UE identifier and a wireless connection indicator, means for receiving, at the authenticator function, from the UDM, an authentication response comprising a permanent UE identifier and an authentication vector, and means for storing one or more parameters of the authentication vector for future authentication.

In some example embodiments, a computer program product is provided comprising a non-transitory computer readable medium including program code which, when executed, causes at least requesting, by a user equipment (UE), a wireless connection to a network entity, receiving, by the UE, from the network entity, an identity request, and in response to the identity request, causing transmission, by the UE, an identity response comprising a UE identifier to the network entity such that the UE is configured to establish a security context with the network entity upon successful authentication using the UE identifier.

In some example embodiments, a computer program product is provided comprising a non-transitory computer readable medium including program code which, when executed, causes at least receiving, at a network entity, a request from a user equipment (UE) for a wireless connection to the network entity, causing transmission, by the network entity, to the UE, of an identity request, and in response to the identity request, receiving, at the network entity, from the UE, an identity response comprising a UE identifier such that the network entity is configured to establish a security context with the UE upon successful authentication using the UE identifier.

In some example embodiments, a computer program product is provided comprising a non-transitory computer readable medium including program code which, when executed, causes at least receiving, at a network function, a request for a wireless connection from a user equipment (UE) to a network entity, receiving, by the network function, from the network entity, a UE identifier, causing transmission, by the network function, to an authentication function, of the UE identifier and a wireless connection indicator, and upon successful authentication using the UE identifier, storing, by the network function, a permanent UE identifier received from the authentication function, and sending a master key received from the authentication function to the network entity.

In some example embodiments, a computer program product is provided comprising a non-transitory computer readable medium including program code which, when executed, causes at least receiving, at an authenticator function, from a network function, an authentication request comprising a user equipment (UE) identifier and a wireless connection indicator, causing transmission, by the authenticator function, to a unified data management (UDM), of an authentication request comprising the UE identifier and a wireless connection indicator, receiving, at the authenticator function, from the UDM, an authentication response comprising a permanent UE identifier and an authentication vector, and storing one or more parameters of the authentication vector for future authentication.

Various other aspects are also described in the following detailed description and in the attached claims. The above-noted aspects and features may be implemented in systems, apparatus, methods, entities, functions, and/or articles depending on the desired configuration. The details of one or more variations of the subject matter described herein are set forth in the accompanying drawings and the description below. Features and advantages of the subject matter described herein will be apparent from the description and drawings, and from the claims.

BRIEF DESCRIPTION OF THE DRAWINGS

Figure 1:
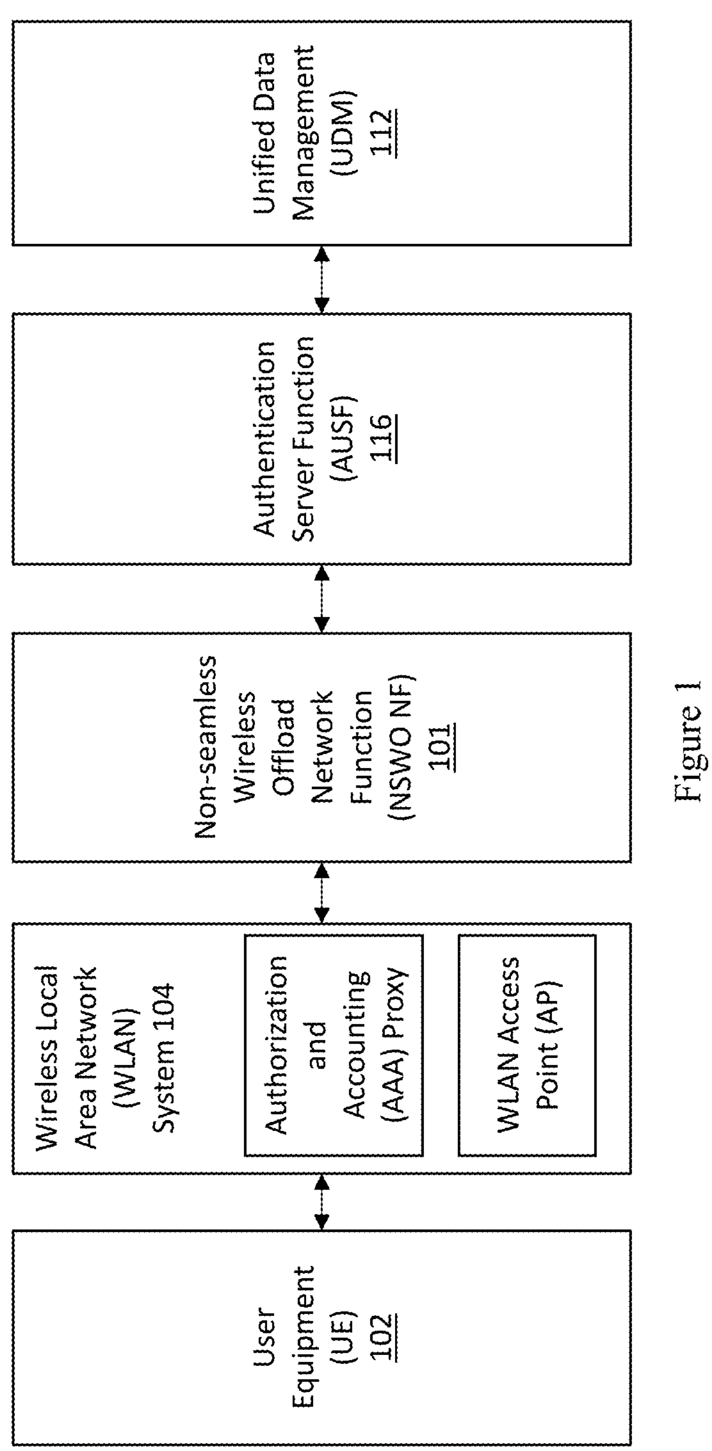
Figure 2:
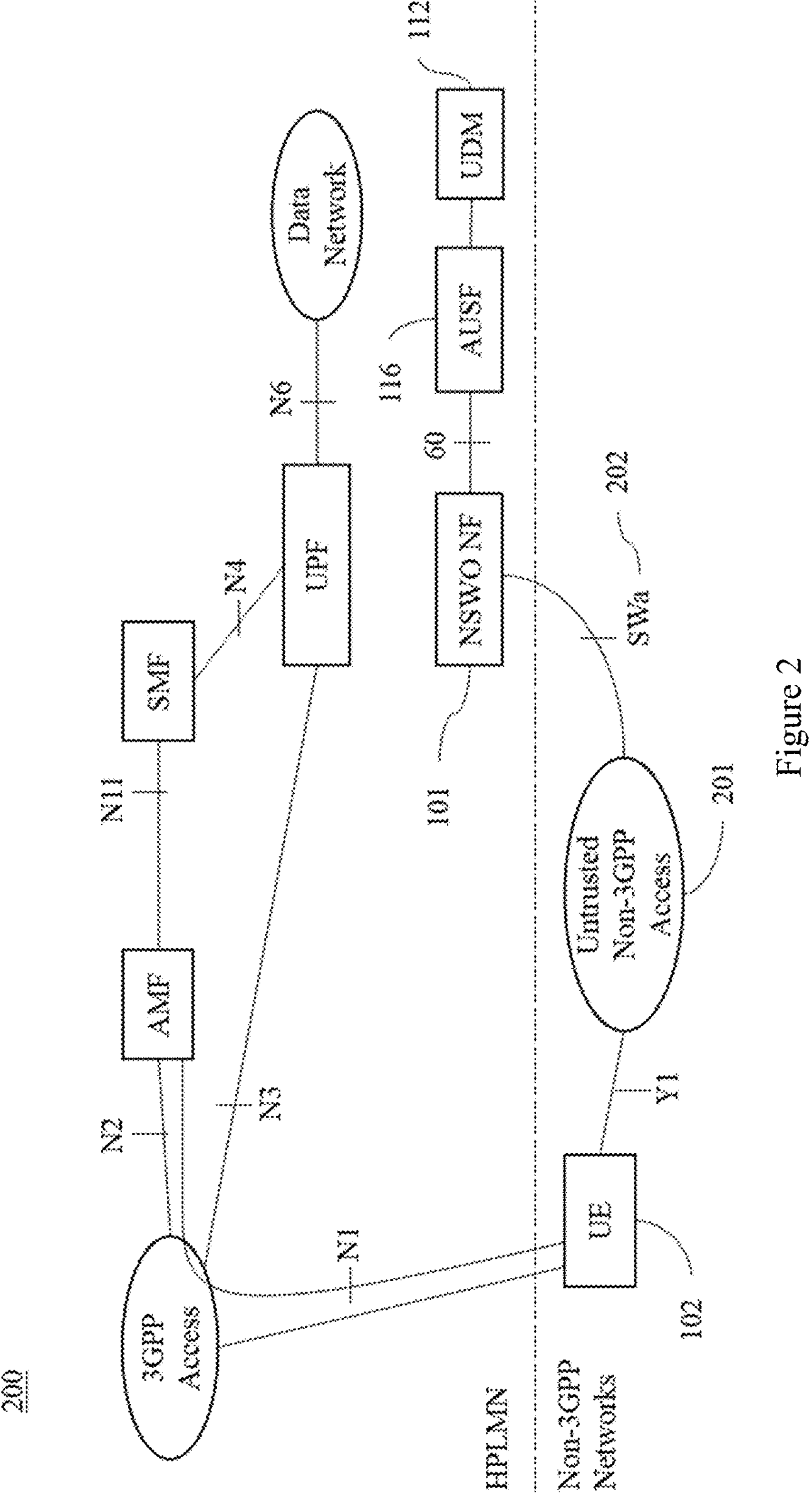
Figure 3:
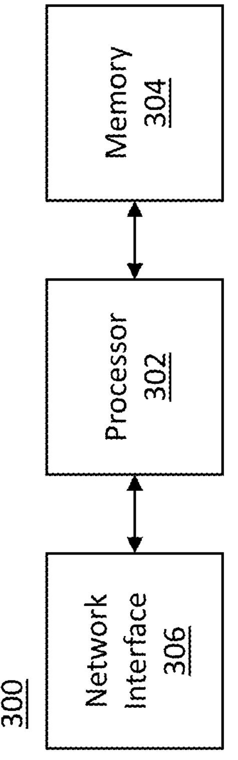
Figure 4:
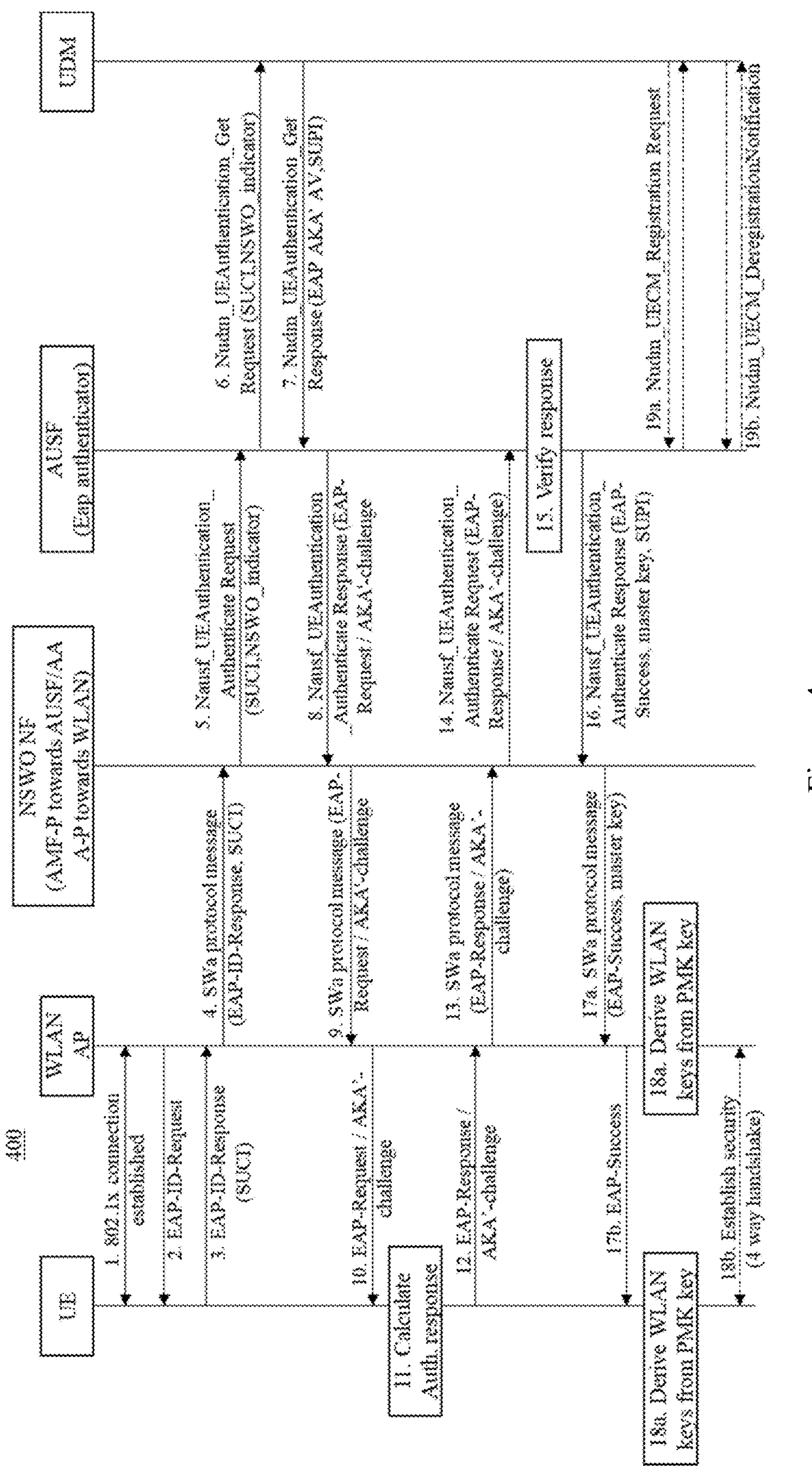
Figure 5:
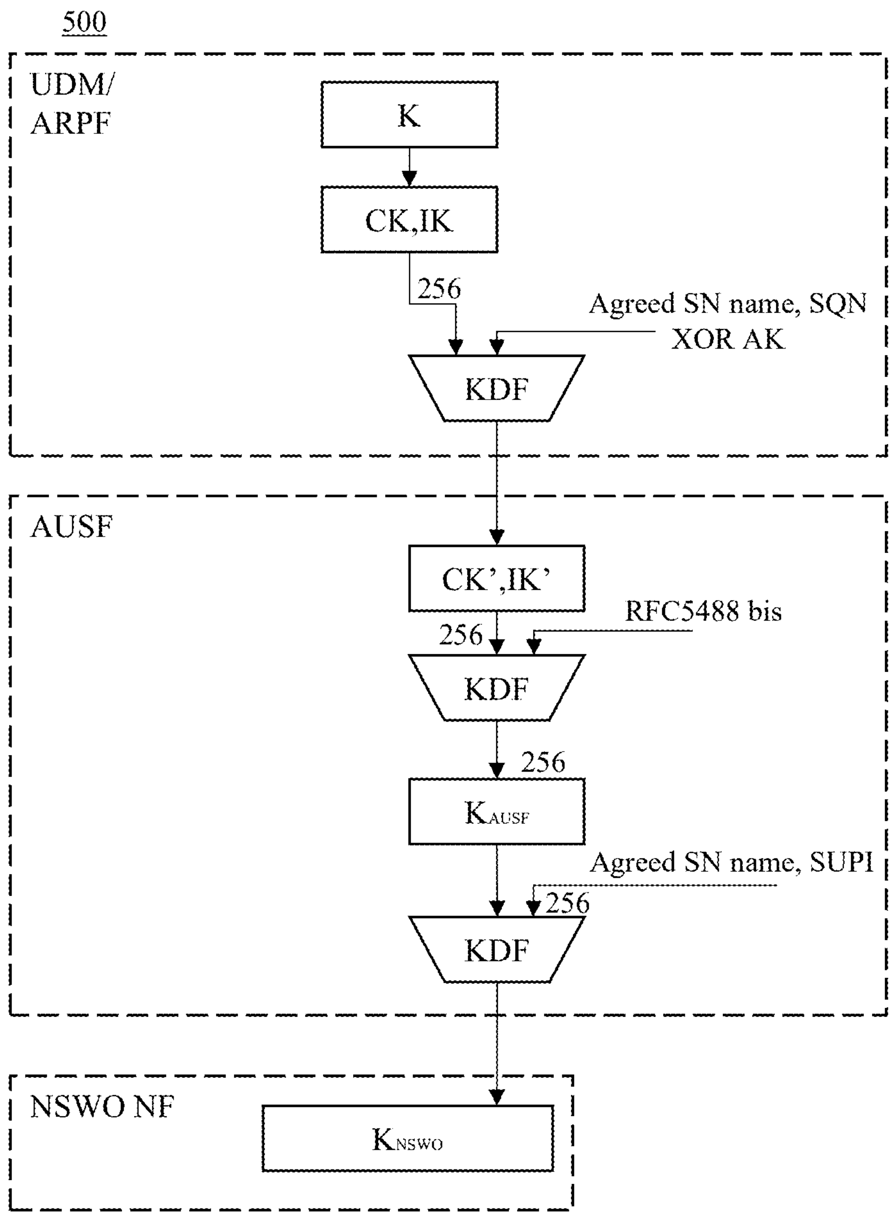
Figure 6:
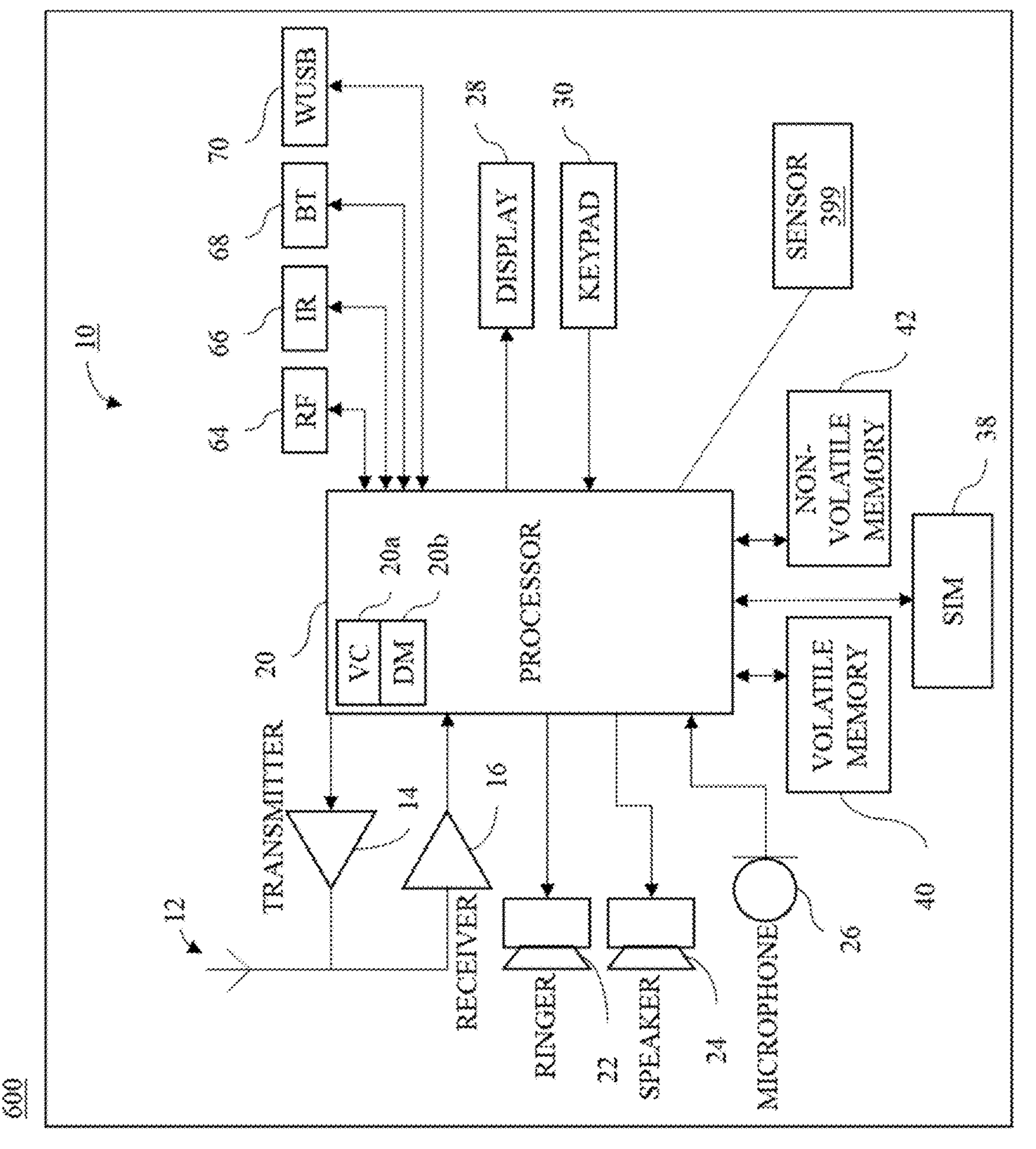
Figure 7:
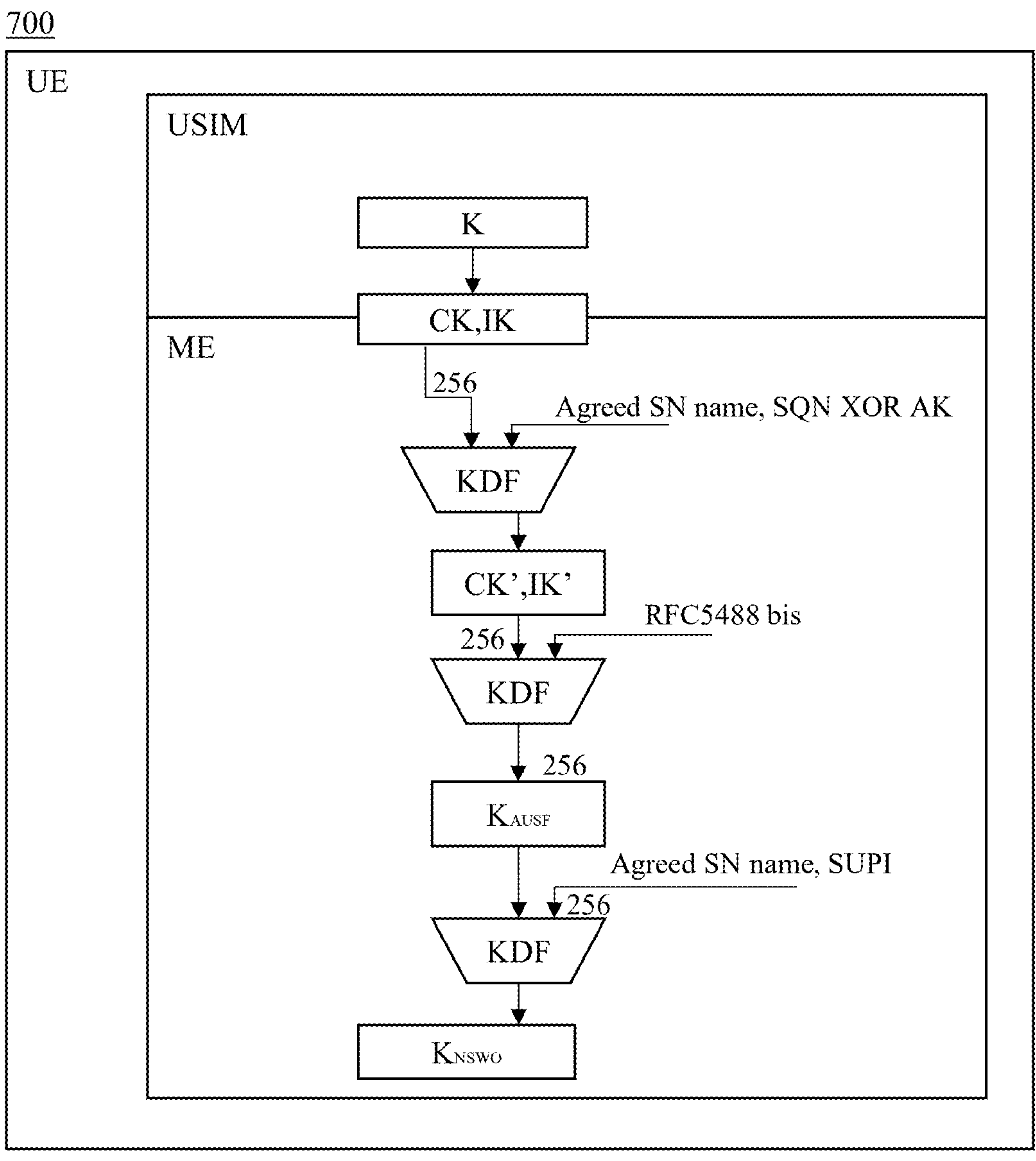
Figure 8:
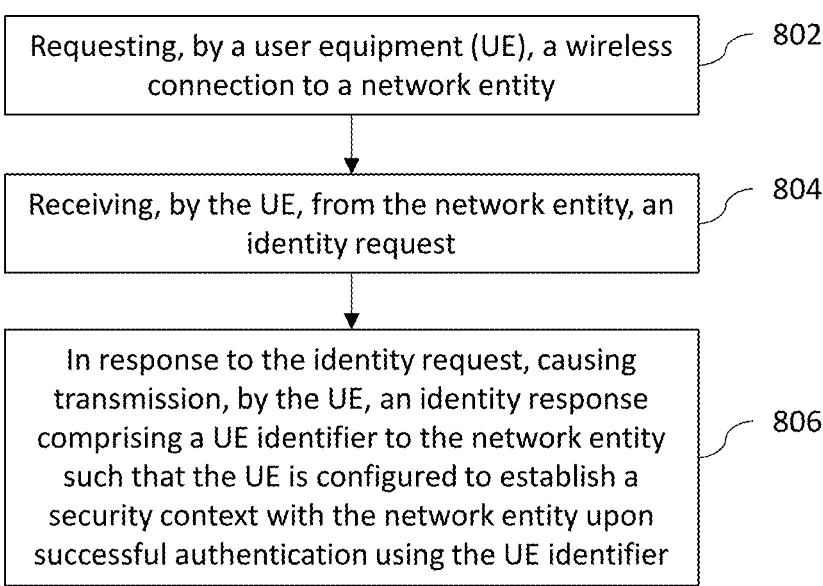
Figure 9:
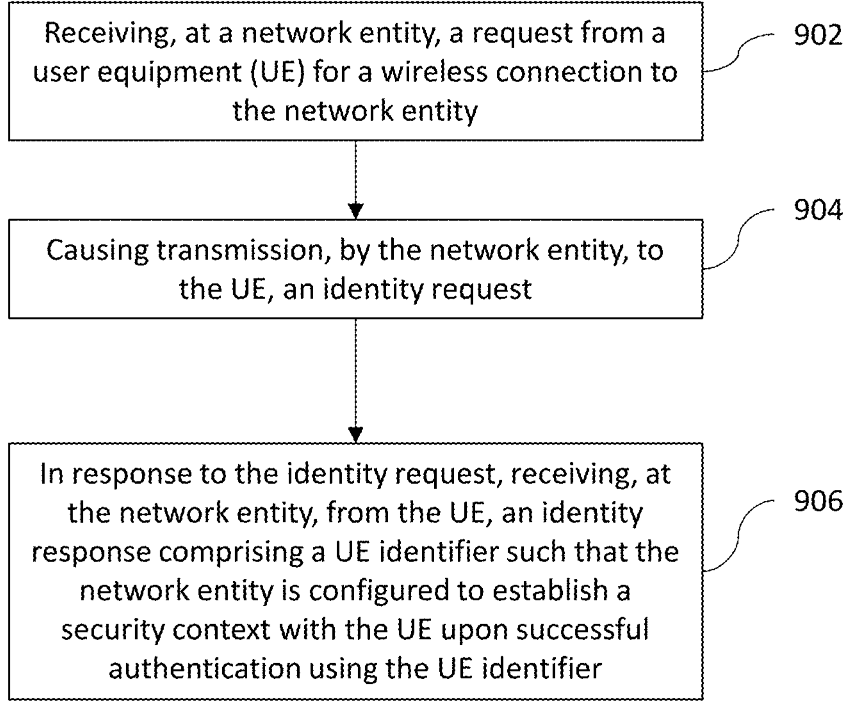
Figure 10:
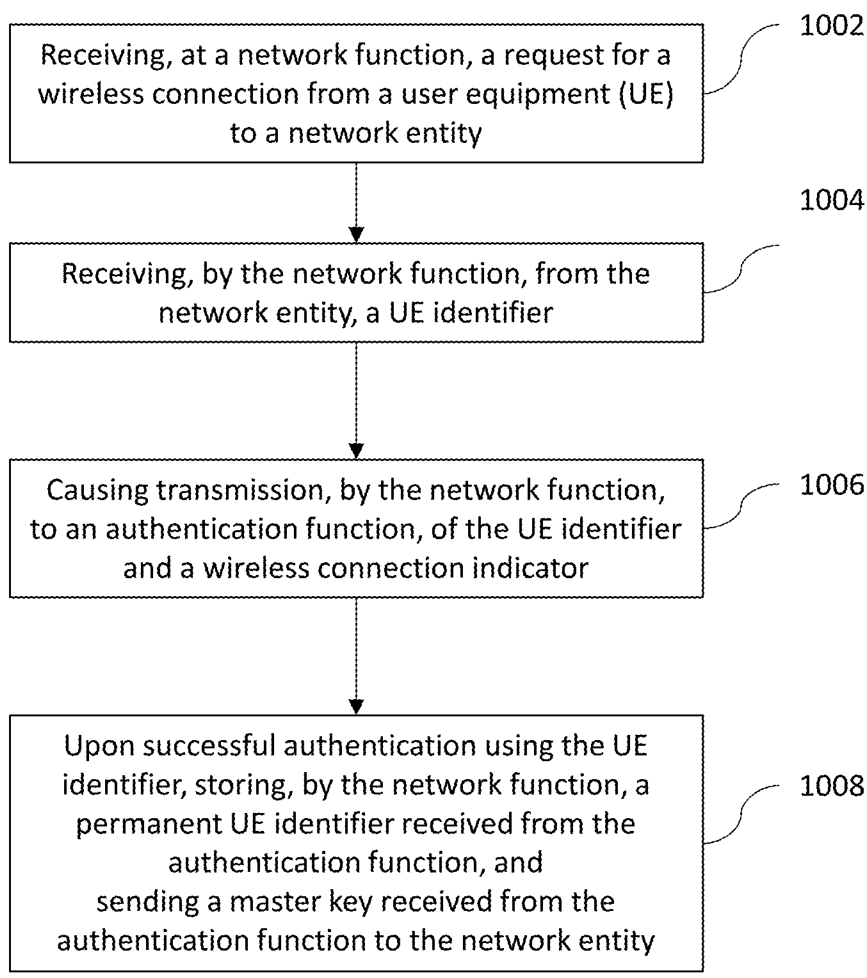
Figure 11:
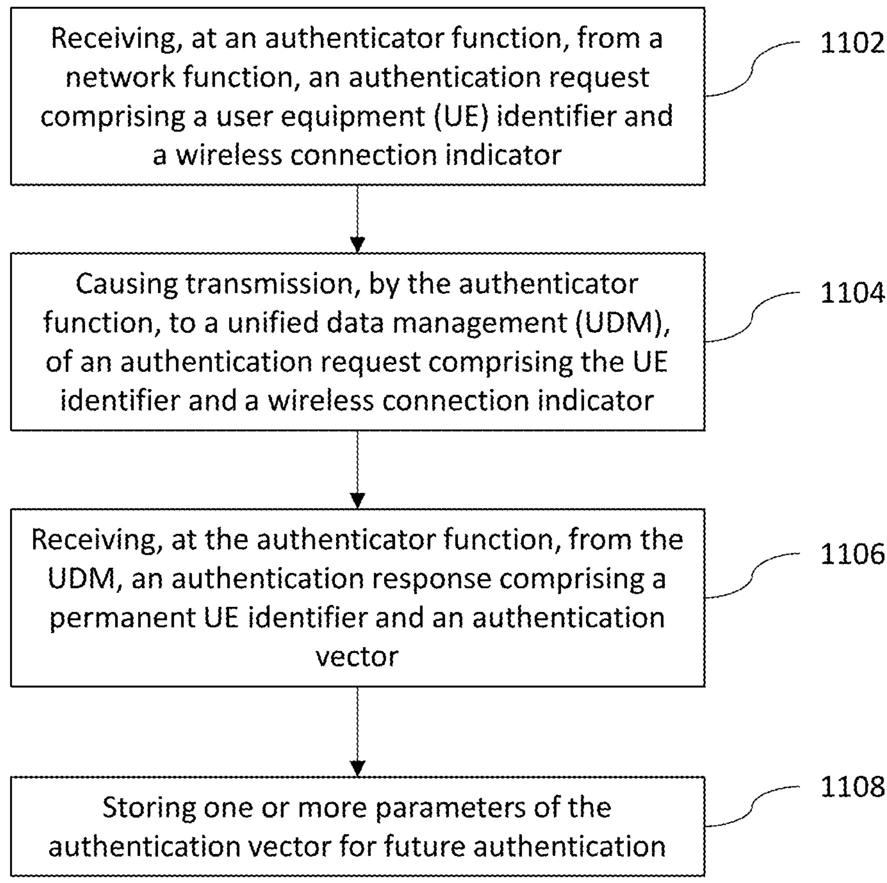

Having thus described certain example embodiments of the disclosure in general terms, reference will now be made to the accompanying drawings, which are not necessarily drawn to scale, and wherein:

FIG. 1 illustrates an example of a portion of a 5G wireless network, in accordance with some example embodiments;

FIG. 2 illustrates an example architecture for a communications network comprising network entities, in accordance with some example embodiments;

FIG. 3 illustrates an example of an apparatus, in accordance with some example embodiments;

FIG. 4 is a flow diagram illustrating the signaling between network entities via a network infrastructure, in accordance with some example embodiments;

FIG. 5 depicts example key derivation operation in a network entity, in accordance with some example embodiments;

FIG. 6 illustrates an example of an apparatus, in accordance with some example embodiments;

FIG. 7 depicts example key derivation operation in a UE, in accordance with some example embodiments;

FIG. 8 is a flow chart illustrating example operations performed, such as by a UE or network entity, in accordance with some example embodiments;

FIG. 9 is a flow chart illustrating example operations performed, such as by a UE or network entity, in accordance with some example embodiments;

FIG. 10 is a flow chart illustrating example operations performed, such as by a UE or network entity, in accordance with some example embodiments; and FIG. 11 is a flow chart illustrating example operations performed, such as by a UE or network entity, in accordance with some example embodiments.

DETAILED DESCRIPTION

Some embodiments of the present invention will now be described more fully hereinafter with reference to the accompanying drawings, in which some, but not all, embodiments of the invention are shown. Indeed, various embodiments of the invention can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms can be used interchangeably to refer to data capable of being transmitted, received and/or stored in accordance with certain embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Additionally, as used herein, the terms "node," "entity," "intermediary," "intermediate entity," "go-between," and similar terms can be used interchangeably to refer to computers connected via, or programs running on, a network or plurality of networks capable of data creation, modification, deletion, transmission, receipt, and/or storage in accordance with an example embodiment of the present invention. Thus, use of any such terms should not be taken to limit the spirit and scope of embodiments of the present invention.

Additionally, as used herein, the terms "user equipment," "user device," "device," "apparatus," "mobile device," "personal computer," "laptop computer," "laptop," "desktop computer," "desktop," "mobile phone," "tablet," "smartphone," "smart device," "cellphone," "computing device," "communication device," "user communication device," "terminal," and similar terms can be used interchangeably to refer to an apparatus, such as may be embodied by a computing device, configured to access a network or plurality of networks for at least the purpose of wired and/or wireless transmission of communication signals in accordance with certain embodiments of the present disclosure. Thus, use of any such terms should not be taken to limit the spirit and scope of embodiments of the present disclosure.

As used herein, a "computer-readable storage medium," which refers to a non-transitory physical storage medium (e.g., volatile or non-volatile memory device), can be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc (BD), the like, or combinations thereof), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where certain embodiments are described to use a computer-readable storage medium, other types of computer-readable mediums can be substituted for or used in addition to the computer-readable storage medium in alternative embodiments.

In the following, certain embodiments are explained with reference to communication devices capable of communication via a wireless network and communication systems serving such communication devices. Before explaining in detail certain example embodiments, certain general principles of a wireless communication system and communication devices are briefly explained to assist in understanding the technology underlying the described examples.

The 3rd Generation Partnership Project (3GPP) is a standards organization which develops protocols for mobile telephony and is known for the development and maintenance of various standards including second generation (2G), third generation (3G), fourth generation (4G), Long Term Evolution (LTE), and 5G standards. The 4G network system allows for NSWO (i.e., enabling a UE to connect to a WLAN access network using subscriber identity module (SIM) based access authentication via the mobile network core and to offload selected traffic to the WLAN). This is a deployed feature in 4G networks, and enables 4G UEs to connect, for example, to a Wi-Fi venue like a hotel or stadium using SIM based access authentication. Further, such feature allows the use of mobile network subscription and roaming agreements for WLAN access and for offloading selected traffic to the WLAN where the selection of the traffic to offload is based on policies and where the offloaded traffic is not using 3GPP defined entities. However, such capabilities is not supported by current 5G specification such that a UE cannot connect to a WLAN access network using its 5G credentials (e.g., SIM) and have traffic offloaded to the WLAN, as in the 4G Evolved Packet Core (EPC).

Despite the issue that current 5G specifications do not i) enable UEs to connect to deployed WLANs that support NSWO, using the UEs' 5G credentials and ii) offload selected traffic directly to these WLANs, for 5G access authentication, two authentication methods: an extensible authentication protocol authentication and key agreement (EAP-AKA') and 5G AKA are supported over both 3GPP access and non-3GPP access for accessing the 5G system of the operator owning the SIM or of one of its roaming partners. Currently, the procedure used for 4G NSWO over trusted non-3GPP access anticipates that the UE may send its international mobile subscriber identity (IMSI) in unencrypted form to the authorization and accounting (AAA) server in the core network. To support NSWO for users with credentials defined in a 5GC, the NSWO authentication procedure would need to make use of credentials provided by the 5GC (e.g., by the unified data management (UDM)/authentication credential repository and processing function (ARPF) in the 5GC). Such new NSWO authentication procedures should also support the same or a similar level of security and privacy as in 5G system (5GS) such that to never expose the IMSI/subscription permanent identifier (SUPI). Accordingly, since the UEs may be provisioned by the operators to use EAP-AKA', EAP-AKA' may be the preferred authentication method to be adopted for 5G NSWO. Currently, already deployed (enterprise) WLAN APs support only EAP authentication framework over RADIUS or diameter interfaces to an operator owned AAA. Since the 5GC is able to support a unified authentication method, including EAP-AKA' the same interfaces could be extended to support NSWO using the same credentials (e.g., IMSI/SUPI). As such, reusing the same EAP-AKA' infrastructure for the NSWO authentication can provide 5G equivalent authentication security to enterprise users as well.

As such, according to some embodiments, UEs need to be authenticated when they are connected to WLAN APs for availing NSWO, otherwise the NSWO could be misused by fraudulent UEs. Fraudulent UEs accessing enterprise WLAN without authentication can consume the WLAN resources and prevent the NSWO for legitimate UEs. This can cause distributed denial-of-service (DDoS) scenarios for NSWO UEs. Furthermore, if subscriber identity privacy is not available during authentication procedure, then tracking of the subscriber with "IMSI catchers" can lead to trackability and linkability attacks. In this case and as described in detail below, 5GS shall support EAP-AKA' authentication method using 5GC credentials for NSWO and providing hiding of the Permanent User Identifier (IMSI/SUPI) from eavesdroppers.

Provided herein are some example embodiments of methods, apparatuses, and computer program products for enabling UEs to connect to deployed WLANs, that support NSWO interworking, such as with 4G 3GPP networks, using the UEs' 5G credentials and to offload selected traffic directly to these WLANs.

By way of example, but not of limitation, the method, apparatus and computer program product of an example embodiment will be described in conjunction with a 5G wireless network. In other embodiments, however, the method, apparatus and computer program product may be utilized in conjunction with other types of networks. For purposes of illustration, however, FIG. 1 depicts an example of a portion of a 5G wireless network 100, in accordance with some example embodiments. The wireless network 100 (e.g., 5G wireless network) may include a user equipment (UE) 102 configured to wirelessly couple to a WLAN being served by a wireless local area network access system (containing one or more WLAN AP, and/or other type of wireless access entities). The wireless network (e.g., 5G wireless network) may include a new network function: non-seamless wireless offload network function (NSWO NF) 101 configured to support NSWO authentication. The NSWO NF 101 is connected to WLAN access system 104 and to an authentication server function (AUSF) 116. The AUSF which may also be referred to as the EAP authenticator is configured to carry out the authentication of the UE as well as store data for authentication of the UE. FIG. 1 also depicts the AUSF connected to UDM 112 which is configured to store user subscription data, and to be able to decipher a subscription concealed identifier (SUCI), etc.

According to some embodiments, an approach for allowing NSWO data traffic to the public internet using SIM based Wi-Fi access authentication in 5G networks can be provided. In some embodiments, such an approach allows the use of mobile network subscription and roaming agreements for Wi-Fi access. Such Wi-Fi access may include, for example, Wi-Fi enabled hotels, stadiums, concert halls, buildings, or the like where internet protocol (IP) connectivity to access internet Wi-Fi offload requires SIM based authentication. Such approaches can comprise methods, apparatuses, systems, computer program products, and/or the like. In some embodiments, such an approach can be provided in which a subscription concealed identifier (SUCI) as part of the network access identifier (NAI) is provided with an identity response (e.g., EAP identity response) transmitted from the UE 102 to the WLAN access system 104 which may also be referred to as a network entity. The identity response may be transmitted from the UE 102 to the WLAN access system 104 in response to an identity request (e.g., EAP identity request). Such identity request may include an explicit request for UE credentials. In this case, the WLAN access system 104 does not need to know that the NAI contains a SUCI and not an IMSI. The SUCI is a privacy preserving UE identifier containing the concealed SUPI. In other words, the SUCI is a secret version of the SUPI. In some embodiments, the UE generates a SUCI using an elliptic curve integrated encryption scheme (ECIES)-based protection scheme with the public key of a home network that was securely provisioned to the 5G system (5GS) subscriber identity module (USIM) during the USIM registration.

In some embodiments, WLAN access system 104 forwards this SUCI to the NSWO NF 101 so as to trigger NSWO authentication via the EAP procedure. In some embodiments the SUPI is used for regular 3GPP access or non-3GPP access to the 5G Core. The SUPI may also be specifically used for NSWO connection. In some embodiments, the NSWO NF 101 is configured to be used as an access and mobility management function (AMF) proxy towards the AUSF 116 in the 5G Core and as an AAA proxy towards WLAN access system 104 to carry out the NSWO authentication.

As illustrated in FIG. 2, a communications network 200 can be provided in which the UE 102 moves into or attaches initially in an untrusted non-3GPP access 201, such as by way of a WLAN access system 104, network entity, and/or the like. In the context of, for example, a non-3GPP network, such as illustrated in FIG. 2, the communications network 200 can comprise a NSWO NF 101 which is connected to the non-3GPP access 201 via a SWa interface 202. In some embodiments, the NSWO NF 101 may be connected to the non-3GPP access 201 via a RADIUS interface or a diameter SWa interface. Furthermore, the NSWO NF 101 is connected to AUSF 116 via new interface Nx (the name of 5G core interface yet to be defined).

The various approaches, methods, processes, procedures, messaging, and UE registration and authentication protocols, described herein, can be carried out by or using any suitable computing device. For example, at the network side, a network entity may be provided for carrying out at least some of these procedures or processes. As a further example, at the UE side, the UE may be or comprise an apparatus, such as a mobile computing device or the like. Examples of such network entities and apparatuses, described hereinbelow, can carry out the various approaches, methods, processes, procedures, messaging, and UE registration protocols described herein.

FIG. 3 depicts a block diagram of a network entity 300, in accordance with some example embodiments. The network entity 300 may be configured to provide one or more network side operations as described with respect to FIG. 9, for example. Moreover, a network entity may have a plurality of network functions. For example, the network entity may be incorporated into one or more of the network entities and functions 104, 101, 116, and 112, described above with regard to FIG. 1.

The network entity 300 may include a network interface 306, a processor 302, and a memory 304, in accordance with some example embodiments. The network interface 306 may include wired and/or wireless transceivers to enable access other entities, nodes, and/or functions including base stations, entities 104, 101, 116, and 112, the Internet, functions, and/or other entities. The memory 304 may comprise volatile and/or non-volatile memory including program code, which when executed by at least one processor 302 provides, among other things, the processes disclosed herein including process 800 and/or the like.

FIG. 6 illustrates a block diagram of an apparatus 10, in accordance with some example embodiments. In some embodiments, the apparatus 10 may represent a user equipment, such as the user equipment 102. The apparatus 10, or portions therein, may be implemented in other network entities including base stations/WLAN access points, functions, as well as the other network entities (e.g., devices 104, 101, 116, and 112).

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads or wirelessly to the transmitter and receiver. Likewise, processor 20 may be configured to control other elements of apparatus 10 by effecting control signaling via electrical leads or wirelessly connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, WLAN techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various communication protocols, such as first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a universal integrated circuit card (UICC), an electronic UICC (eUICC), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the base stations/WLAN access points and network nodes including the UEs (see, e.g., method 70 and/or 80).

FIG. 4 illustrates an example embodiment of a procedure for UE authentication in NSWO. As illustrated, at element 1, a connection is established between the UE and the WLAN AP. In some embodiments the connection may be established using a specific procedure based on IEEE 802.11. As illustrated in element 2, the WLAN AP may transmit an identity request to the UE in order to authenticate the UE. For example, the WLAN AP may transmit an EAP Identity Request to the UE. In response to the identity request, the UE may respond with an identity response comprising a UE identifier or its UE credential. For example, and as illustrated in element 3, the UE responds with an EAP identity response with SUCI as part of the NAI. In some embodiments, the WLAN AP does not need to know that the NAI contains a SUCI and not an IMSI. As illustrated in element 4, the WLAN AP (or a dedicated element of the WLAN access system 104) sends a SWa protocol message with an EAP identity response to a new network entity. For example, the new network entity is a NSWO network function. In some embodiments, the EAP identity response may be sent over a radius interface or a diameter interface. In this example embodiment, the NAI includes the user identifier (e.g., SUCI). In the example embodiment, the new network entity NSWO NF acts as a AMF-Proxy towards AUSF. In another embodiment the NSWO NF acts as a AAA-Proxy towards the WLAN Access Point. As illustrated in element 5, the NSWO NF sends the message Nausf_UEAuthentication_Authenticate Request with SUCI and NSWO indicator towards the AUSF. In some embodiments, the NSWO_indicator conveys the information that the authentication procedure is triggered for non-seamless WLAN offload purposes. As shown in element 6, the AUSF (i.e., EAP authenticator) sends a Nudm_UEAuthentication_Get Request to the UDM including the SUCI and NSWO indicator. Upon receiving the Nudm_UEAuthentication_Get Request, the UDM invokes a de-concealment, of the SUPI from the SUCI. In other words, the UDM triggers the subscriber identity de-concealing function (SIDF) which is a functional element of the UDM responsible for decrypting the SUCI to reveal the UE's SUPI before the UDM can process the wireless connection registration request. As illustrated in element 7, the UDM may then generate an authentication vector, such as the EAP AKA' authentication vector (RAND,AUTN,XRES, CK' and IK') and transmit the authentication parameters along with the SUPI to the AUSF in an authentication response message such as Nudm_UE-Authentication_Get Response message. In some embodiments, the AUSF stores at least one parameter such as the expected result (XRES) for future verification.

As illustrated in element 8, the AUSF transmits an authentication challenge message such as the EAP-Request/AKA'-Challenge message to the NSWO NF in a Nausf_UEAuthentication_Authenticate Response message. Thereafter and as illustrated in element 9, the NSWO NF sends SWa protocol message with EAP-Request/AKA'-Challenge message to the WLAN AP (or to a dedicated element of the WLAN access system 104). The WLAN AP will then forward the same authentication challenge message such as EAP-Request/AKA'-Challenge message to the UE as illustrated by element 10. In some embodiments and as illustrated in element 11, at receipt of the RAND and AUTN, the USIM of the UE verifies the freshness of the AV' by checking whether AUTN can be accepted as described in TS 33.102. If so, the USIM computes a response. The USIM may then return parameters such as RES, CK, IK to the ME. The ME may derive CK' and IK' according to TS 33.501 Annex A.3. If the verification of the AUTN fails on the USIM, then the USIM and ME proceed as described in TS 33.501 sub-clause 6.1.3.3.

As illustrated in element 12, the UE may transmit the EAP-Response/AKA'-Challenge message to the WLAN AP and in element 13, the WLAN AP (or a dedicated element of the WLAN access system 104) forwards the EAP-Response/AKA'-Challenge message in SWa protocol message to NSWO NF. The NSWO NF will transmit the Nausf_UEAuthentication_Authenticate Request with EAP-Response/AKA'-Challenge message to AUSF as illustrated in element 14. The AUSF may verify if the received response against the stored and expected response XRES as illustrated in element 15. If the AUSF has successfully verified the received response, it will continue as follows to element 16, otherwise it will return an error to the NSWO NF. AUSF will then inform UDM about the authentication results as described in TS 33.501 sub-clause 6.1.4. The AUSF derives the required master key KNSWO as described in FIG. 5 below and as illustrated by element 16, the AUSF sends Nausf_UEAuthentication_Authenticate Response message with EAP-success, master key and SUPI to NSWO NF. In some embodiments, the NSWO NF may store the SUPI. The NSWO NF transmits a SWa protocol message with EAP-success and master key to WLAN AP (or to a dedicated element of the WLAN access system 104) as illustrated in element 17*a*. The EAP-success message is forwarded from WLAN AP to the UE as illustrated by element 17*b*. In some embodiments, the master key (MSK) over SWa may also be determined by the NSWO NF. As illustrated in element 18*a*, WLAN keys are generated in UE and WLAN AP independently. Thereafter, a 4-way handshake is executed (see IEEE 802.11) which establishes a security context between the WLAN AP and the UE as illustrated by element 18*b*. Finally and as illustrated in element 19, the NSWO NF may also optionally register (for NSWO service of the UE that has been authenticated) with the UDM. If the subscription is cancelled, then the UDM can send a deregistration notification towards the NSWO NF. If the deregistration notification is received from UDM, the NSWO NF will trigger a non-3GPP Access network Initiated Session Termination towards WLAN (as described in TS 29.273 clause 5.2.2.4).

In some embodiments, new master keys or anchor keys (e.g., NSWO keys) may need to be generated in the network entities and the UE. FIG. 5 illustrates key derivation in network entities UDM/ARPF and AUSF. As illustrated in FIG. 5, key derivation of CK', IK', KAUSF remains the same as described in TS 33.501 clause 6.2.2 except that SN Name is used. The key KNSWO is generated from key KAUSF, agreed SN name and SUPI in AUSF. In some embodiments, the generated KNSWO key is shared to NSWO NF.

The serving network name is used in the derivation of the NSWO keys. In some embodiments, the serving network name is carried in the following: the network name field of the AT_KDF_INPUT attribute defined in IETF RFC 5448 bis; in KAUSF derivation function as specified in 3GPP TS 33.501 annex A; and/or in RES* and XRES* derivation function as specified in 3GPP TS 33.501 annex A. In some embodiments the serving network name is the concatenation of a service code and the SN Id such that the service code prepends the SN Id with a separation character ":". For example, SN Id=PLMN ID:NID. For standalone non-public networks, the SN Id which is used in the input for various key/parameter derivations identifies the serving SNPN and is specified in detail in TS 24.501 [35]. The SN Id identifies the serving PLMN or the serving SNPN. As the serving network is not considered in NSWO authentication procedure flow, either home network PLMN or default serving network value is considered for master key/anchor key generation and response generations. In case of a default serving network name being used, then it has to be mutually pre-agreed and used in both network and UE independently. In the case of a public network, MCC and MNC in the SNN-PLMN-ID are MCC and MNC of the home network PLMN. If the MNC of the home network or default serving network PLMN has two digits, then a zero is added at the beginning. In the case of a private network, MCC and MNC in the SNN-SNPN-ID are MCC and MNC of the home network SNPN. If the MNC of the home network or default serving network SNPN has two digits, then a zero is added at the beginning. Additionally or alternatively, NSWO NF could also provide a default serving network name such as 'WLAN' or 'NSWO WLAN' to AUSF, during an authentication request from UE that is received via WLAN AP. The UE would also know such default serving network name to be used via configuration. Additionally or alternatively, the SSID of the WLAN access point the UE is trying to reach may be used as a serving network name.

Turning now to FIG. 5, master/anchor key derivation is illustrated in network entities, for example, entities UDM/ARPF, AUSF, and NSWO NF. Like that of 4G, 5G also supports mutual authentication in which the network authenticates the UE (e.g., subscriber) and the UE subscriber authenticates the network, (e.g., it determines whether the network it is communicating with has access to a valid authentication vector generated in its home network). This is achieved by adding the serving network name (e.g., "Agreed SN name") into a KDF (Key Derivation Function) at both the UDM/ARPF in the home network, the AUSF, and as shown in FIG. 7, in the UE itself. In an example embodiment and as illustrated in FIG. 5, the master/anchor key (e.g., key KNSWO) is generated from key KAUSF, agreed SN name and SUPI in AUSF.

FIG. 7 illustrates KNSWO key derivation in the UE. In some embodiments, key derivation of CK', IK', KAUSF remains the same as described in TS 33.501 clause 6.2.2 except that SN Name is used. As shown in FIG. 7, the key KNSWO is generated from key KAUSF, agreed SN name and SUPI in ME. Additionally and in some embodiments the generated KNSWO key is shared to NSWO NF. With KNSWO keys in place, it is now possible to secure NAS signaling between the UE and the network entities. Further, this ensures that for authentication to be successful, the visited network requesting authentication vectors from the home network is the same network that the device is actually connected to during the authentication procedure.

FIG. 8 depicts a method 800 for wireless communications by a UE. The method comprises requesting, by a user equipment (UE), a wireless connection to a network entity at 802. In an example embodiment, the wireless connection is a non-seamless wireless offload (NSWO) connection to the network entity during an extensible authentication protocol (EAP) procedure. Said requesting 802 can be carried out using any suitable apparatus comprising means, e.g., an apparatus comprising one or more processors and one or more memories, network interface 306, transmitter 14, the apparatus 10, a mobile telephone, or the like. The method further comprises receiving, by the UE, from the network entity, an identity request at 804. The identity request being an EAP-ID-Request. Said receiving 804 can be carried out using any suitable apparatus comprising means, e.g., an apparatus comprising one or more processors and one or more memories, the network interface 306, a receiver 16, the apparatus 10, a mobile telephone, a computing device comprising a receiver-transponder or another suitable communications device, or the like. The method further comprises in response to the identity request, causing transmission, by the UE, of an identity response comprising a UE identifier to the network entity such that the UE is configured to establish a security context with the network entity upon successful authentication using the UE identifier at 806. Said UE identifier of an example embodiment is a subscription concealed identifier (SUCI) used for regular 3rd generation partnership project (3GPP) access or non-3GPP access to a fifth generation core (5GC). Further, said UE identifier of an example embodiment serves as a 5GC credential used in the NSWO connection. Said causing transmission 806 can be carried out using any suitable apparatus comprising means, e.g., an apparatus comprising one or more processors and one or more memories, the network interface 306, the transmitter 14, the apparatus 10, a mobile telephone, a computing device comprising a receiver-transponder or another suitable communications device, or the like. The identity response may be an EAP-ID-Response and the NAI of the EAP-ID-Response may include the SUCI instead of an IMSI associated with the UE.

FIG. 9 depicts a method 900 for wireless communications. The method comprises receiving, at a network entity, a request from a user equipment (UE) for a wireless connection to the network entity at 902. In an example embodiment, the wireless connection is a non-seamless wireless offload (NSWO) connection to the network entity during an extensible authentication protocol (EAP) procedure. Said receiving 902 can be carried out using any suitable network entity comprising means, e.g., a network entity comprising one or more processors and one or more memories, a network interface 306, the receiver 16, the network entity 300, WLAN AP 104, a network entity comprising a wireless receiver, or the like. The method further comprises causing transmission, by the network entity, to the UE, of an identity request at 904. The identity request may be an EAP-ID-Request. Said causing transmission 904 can be carried out using any suitable network entity comprising means, e.g., a network entity comprising one or more processors and one or more memories, a network interface 306, the transmitter 14, the network entity 300, WLAN AP 104, a network entity comprising a wireless receiver, or the like. The method further comprises in response to the identity request, receiving, at the network entity, from the UE, an identity response comprising a UE identifier such that the network entity is configured to establish a security context with the UE upon successful authentication using the UE identifier at 906. The identity response may be an EAP-ID-Response. Said UE identifier of one embodiment is a subscription concealed identifier (SUCI) used for regular 3rd generation partnership project (3GPP) access or non-3GPP access to a fifth generation core (5GC). Further, said UE identifier of an example embodiment serves as a 5GC credential used in the NSWO connection. Said receiving 906 can be carried out using any suitable network entity comprising means, e.g., a network entity comprising one or more processors and one or more memories, the network interface 306, the receiver 16, the network entity 300, WLAN AP 104, a network entity comprising a wireless receiver, or the like.

The method further comprises causing transmission, by the network entity, to a network function, of the identity response. Said network function may be a NSWO network function configured to be used as an access and mobility management function (AMF) proxy towards an authentication server function (AUSF) in a fifth generation core (5GC) and as an authentication, authorization, and accounting (AAA) proxy towards the wireless connection. Said causing transmission, by the network entity, to a network function, the identity response can be carried out using any suitable network entity comprising means, e.g., a network entity comprising one or more processors and one or more memories, the network interface 306, the transmitter 14, the network entity 300, WLAN AP 104, a network entity comprising a wireless receiver, or the like. The method further comprises receiving, at the network entity, from the network function, an authentication challenge message. Said authentication challenge message of an example embodiment is an EAP-Request/AKA'-Challenge message. The method further comprises causing transmission, by the network entity, to the UE, of the authentication challenge message. Said receiving and causing transmission of the authentication challenge message can be carried out using any suitable network entity comprising means, e.g., a network entity comprising one or more processors and one or more memories, a network interface 306, the transmitter 14, the network entity 300, WLAN AP 104, a network entity comprising a wireless receiver, or the like. The method further comprises causing transmission, by the network entity, to the UE, a success message in response to successful authentication using the UE identifier. The success message may be an EAP-Success message. Said causing transmission, by the network entity, to the UE, a success message in response to successful authentication using the UE identifier can be carried out using any suitable network entity comprising means, e.g., a network entity comprising one or more processors and one or more memories, the network interface 306, the transmitter 14, the network entity 300, WLAN AP 104, a network entity comprising a wireless receiver, or the like.

FIG. 10 depicts a method 1000 for wireless communications. The method comprises receiving, at a network function, a request from a user equipment (UE) for a wireless connection to a network entity at 1002. Said wireless connection is a non-seamless wireless offload (NSWO) connection to the network entity during, for example, an extensible authentication protocol (EAP) procedure. Said receiving 1002 can be carried out using any suitable network entity comprising means, e.g., a network entity comprising one or more processors and one or more memories, the network interface 306, the receiver 16, the network entity 300, NSWO NF 101, a network entity comprising a wireless receiver, or the like. The method further comprises receiving, by the network function, from the network entity, a UE identifier at 1004. Said receiving 1004 can be carried out using any suitable network entity comprising means, e.g., a network entity comprising one or more processors and one or more memories, the network interface 306, the receiver 16, the network entity 300, NSWO NF 101, a network entity comprising a wireless receiver, or the like. In an example embodiment, the UE identifier is a subscription concealed identifier (SUCI) used for regular 3rd generation partnership project (3GPP) access or non-3GPP access to a fifth generation core (5GC). Further, said UE identifier may serve as a 5GC credential used in the NSWO connection. The method further comprises causing transmission, by the network function, to an authentication function, the UE identifier and a wireless connection indicator 1006. Said causing transmission 1006 can be carried out using any suitable network entity comprising means, e.g., a network entity comprising one or more processors and one or more memories, the network interface 306, the transmitter 14, the network entity 300, NSWO NF 101, a network entity comprising a wireless receiver, or the like. The method further comprises upon successful authentication using the UE identifier, storing, by the network function, a permanent UE identifier received from the authentication function, and sending a master key received from the authentication function to the network entity at 1008. Said storing 1008 can be carried out using any suitable network entity comprising means, e.g., a network entity comprising one or more processors and one or more memories, the network entity 300, NSWO NF 101, a network entity comprising a wireless receiver, or the like. Said permanent UE identifier of one example embodiment is a subscription permanent identifier (SUPI) derived from the UE identifier. Said wireless connection indicator indicates that an extensible authentication protocol (EAP) procedure is triggered for non-seamless wireless offload (NSWO) connection purposes. Said authentication function is configured to determine an authentication type using the wireless connection indicator and trigger the EAP procedure for NSWO connection purposes in accordance with the authentication type. The method further comprises sending a master key received from the authentication function to the network entity. The method further comprises causing transmission, by the network function, to a unified data management (UDM), a registration request message for registering the UE. Said causing transmission, by the network function, to a unified data management (UDM), a registration request message for registering the UE can be carried out using any suitable network entity comprising means, e.g., a network entity comprising one or more processors and one or more memories, the network interface 306, the transmitter 14, the network entity 300, NSWO NF 101, a network entity comprising a wireless receiver, or the like. The registration request message may be a Nudm_UECM_Registration request.

The method further comprises upon receiving, at the network function, from the UDM, a deregistration message for deregistering the UE, triggering a termination of the wireless connection to the network entity. Said receiving, at the network function, from the UDM, a deregistration message for deregistering the UE, triggering a termination of the wireless connection to the network entity can be carried out using any suitable network entity comprising means, e.g., a network entity comprising one or more processors and one or more memories, the network interface 306, the receiver 16, the network entity 300, NSWO NF 101, a network entity comprising a wireless receiver, or the like. The deregistration request message may be a Nudm_UECM_DeregistrationNotification request. In an example embodiment, the network function is configured to be used as an access and mobility management function (AMF) proxy towards an authentication server function (AUSF) in a fifth generation core (5GC) and as an authentication, authorization, and accounting (AAA) proxy towards the wireless connection.

FIG. 11 depicts a method 1100 for wireless communications. The method comprises receiving, at an authenticator function, from a network function, an authentication request comprising a user equipment (UE) identifier and a wireless connection indicator at 1102. Said wireless connection is a non-seamless wireless offload (NSWO) connection to the network entity, such as during an extensible authentication protocol (EAP) procedure. Said receiving 1102 can be carried out using any suitable network entity comprising means, e.g., a network entity comprising one or more processors and one or more memories, the network interface 306, the receiver 16, the network entity 300, AUSF 116, a network entity comprising a wireless receiver, or the like. The method further comprises causing transmission, by the authenticator function, to a unified data management (UDM), of an authentication request comprising the UE identifier and a wireless connection indicator at 1104. The authentication request may be an Nausf_UEAuthentication_Authenticate request. In an example embodiment, the UE identifier is a subscription concealed identifier (SUCI) used for regular 3rd generation partnership project (3GPP) access or non-3GPP access to a fifth generation core (5GC). Further, said UE identifier may serve as a 5GC credential used in the NSWO connection. Said wireless connection indicator of this example embodiment indicates that an extensible authentication protocol (EAP) procedure is triggered for non-seamless wireless offload (NSWO) connection purposes. Said causing transmission 1104 can be carried out using any suitable network entity comprising means, e.g., a network entity comprising one or more processors and one or more memories, the network interface 306, the transmitter 14, the network entity 300, AUSF 116, a network entity comprising a wireless receiver, or the like. The method further comprises receiving, at the authenticator function, from the UDM, an authentication response comprising a permanent UE identifier and an authentication vector at 1106. The authentication response may be an Nausf_UEAuthentication_Authenticate response. Said receiving 1106 can be carried out using any suitable network entity comprising means, e.g., a network entity comprising one or more processors and one or more memories, the network interface 306, the receiver 16, the network entity 300, AUSF 116, a network entity comprising a wireless receiver, or the like. In an example embodiment, the UE identifier is a subscription concealed identifier (SUCI) and the permanent UE identifier is a subscription permanent identifier (SUPI) derived from the SUCI. Said network function may be configured to be used as an access and mobility management function (AMF) proxy towards an authentication server function (AUSF) in a fifth generation core (5GC) and as an authentication, authorization, and accounting (AAA) proxy towards the wireless connection. The method further comprises storing one or more parameters of the authentication vector for future authentication at 1108. Said storing 1108 can be carried out using any suitable network entity comprising means, e.g., a network entity comprising one or more processors and one or more processors and one or more memories, the network entity 300, AUSF 116, a network entity comprising a wireless receiver, or the like.

The method further comprises causing transmission, by the authenticator function, to the network function, of an authentication challenge message. Said causing transmission, by the authenticator function, to the network function, an authentication challenge message can be carried out using any suitable network entity comprising means, e.g., a network entity comprising one or more processors and one or more memories, the network interface 306, the transmitter 14, the network entity 300, AUSF 116, a network entity comprising a wireless receiver, or the like. The method further comprises determining, at the authenticator function, whether or not a response to the authentication challenge message is valid. Said determining, at the authenticator function, whether or not a response to the authentication challenge message is valid can be carried out using any suitable network entity comprising means, e.g., a network entity comprising one or more processors and one or more memories, the network entity 300, AUSF 116, a network entity comprising a wireless receiver, or the like. If valid, the method further comprises causing transmission, by the authenticator function, to the network function, a success message comprising a master key and the permanent UE identifier. Causing transmission of the success message can be carried out using any suitable network entity comprising means, e.g., a network entity comprising one or more processors and one or more memories, the network interface 306, the transmitter 14, the network entity 300, AUSF 116, a network entity comprising a wireless receiver, or the like. Said master key is established as a result of a key derivation process based on, at least in part, a serving network name provided by the network function. If not valid, the method further comprises causing transmission, by the authenticator function, to the network function, an unsuccessful message indicating that wireless connection to the network entity is not allowed. Causing transmission of the unsuccessful message can be carried out using any suitable network entity comprising means, e.g., a network entity comprising one or more processors and one or more memories, the network interface 306, the transmitter 14, the network entity 300, AUSF 116, a network entity comprising a wireless receiver, or the like.

As described above, the referenced flowcharts of methods that can be carried out by an apparatus according to related computer program products comprising computer program code. It will be understood that each block of the flowcharts, and combinations of blocks in the flowcharts, can be implemented by various means, such as hardware, firmware, processor, circuitry, and/or other devices associated with execution of software including one or more computer program instructions. For example, one or more of the procedures described above can be embodied by computer program instructions. In this regard, the computer program instructions which embody the procedures described above can be stored by a memory devices, e.g., 40 and 42, of an apparatus, e.g., 10, employing an embodiment of the present invention and executed by processor, e.g., 20, of the apparatus. As will be appreciated, any such computer program instructions can be loaded onto a computer or other programmable apparatus (e.g., hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture, the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

In some further example embodiments, a computer program product is provided, said computer program product may be stored by or on an apparatus (e.g., network entity 300) or a component thereof. Said computer code can be executed by an apparatus (e.g., network entity 300). A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but can, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations, methods, steps, processes, apparatuses, or the like, above can be modified or further amplified. Furthermore, in some embodiments, additional optional operations, methods, steps, processes, hardware, or the like, can be included. Modifications, additions, subtractions, inversions, correlations, proportional relationships, disproportional relationships, attenuation and/or amplifications to the operations above can be performed in any order and in any combination. It will also be appreciated that in instances where particular operations, methods, processes, or the like, required particular hardware such hardware may be considered as part of apparatus 200 for any such embodiment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe certain example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed is:

1. A method comprising:

requesting, by a user equipment (UE), a non-seamless wireless offload (NSWO) connection to a network entity;

receiving, by the UE, from the network entity, an identity request; in response to the identity request, causing transmission, by the UE, of an identity response comprising a UE identifier to the network entity, wherein (i) the UE identifier comprises a subscription concealed identifier (SUCI), (ii) the SUCI is part of a network access identifier (NAI), and (iii) the SUCI is generated based on a public key of a home network associated with a registration of the UE;

deriving, by the UE, a master key (MSK) during authentication with the network entity; and establishing, by the UE, a security context with the network entity upon successful authentication based on the MSK.

2. The method according to claim 1, wherein the NSWO connection to the network entity is during an extensible authentication protocol (EAP) procedure and the UE identifier is used for 3rd generation partnership project (3GPP) access or non-3GPP access to a fifth generation core (5GC).

3. The method according to claim 1, wherein the UE identifier serves as a fifth generation core (5GC) credential used in the NSWO connection.

4. The method according to claim 1, wherein the SUCI is generated using an elliptic curve integrated encryption scheme (ECIES)-based protection scheme.

5. The method according to claim 1, wherein the network entity comprises a wireless local area network (WLAN) Access Point (AP).

6. A method comprising:

receiving, by a network function, from a network entity, a user equipment (UE) identifier;

causing transmission, by the network function, to an authentication function, of the UE identifier and a wireless connection indicator, wherein the wireless connection indicator indicates that an extensible authentication protocol (EAP) procedure is triggered for non-seamless wireless offload (NSWO) connection purposes; and upon successful authentication using the UE identifier, sending a master key received from the authentication function to the network entity.

7. The method according to claim 6, further comprising storing, by the network function upon successful authentication using the UE identifier, a permanent UE identifier received from the authentication function, wherein the permanent UE identifier is a subscription permanent identifier (SUPI) derived from the UE identifier.

8. The method according to claim 6, wherein the authentication function is configured to determine an authentication type using the wireless connection indicator and trigger the extensible authentication protocol (EAP) procedure for the NSWO connection purposes in accordance with the authentication type.

9. The method according to claim 6, further comprising:

causing transmission, by the network function, to a unified data management (UDM), of a registration request message for registering the UE; and upon receiving, at the network function, from the UDM, a deregistration message for deregistering the UE, triggering a termination of a wireless connection to the network entity.

10. The method according to claim 6, further comprising:

receiving, at the network function, the master key and a subscription permanent identifier (SUPI), wherein the master key is established as a result of a key derivation process based on, at least in part, a serving network name provided by the network function.

11. The method according to claim 6, wherein the network function is configured to be used as an access and mobility management function (AMF) proxy towards an authentication server function (AUSF) in a fifth generation core (5GC) and as an authentication, authorization, and accounting (AAA) proxy towards a wireless connection.

12. The method according to claim 6, wherein the UE identifier is a subscription concealed identifier (SUCI).

13. The method according to claim 6, wherein the UE identifier serves as a fifth generation core (5GC) credential used in a NSWO connection.

14. An apparatus comprising:

at least one processor; and at least one memory including computer program code, the at least one memory and the computer program code configured to, with the at least one processor, cause the apparatus to at least:

request, by a user equipment (UE), a non-seamless wireless offload (NSWO) connection to a network entity;

receive, by the UE, from the network entity, an identity request;

in response to the identity request, cause transmission, by the UE, of an identity response comprising a UE identifier to the network entity, wherein (i) the UE identifier comprises a subscription concealed identifier (SUCI), (ii) the SUCI is part of a network access identifier (NAI), and (iii) the SUCI is generated based on a public key of a home network associated with a registration of the UE;

derive, by the UE, a master key (MSK) during authentication with the network entity; and establish, by the UE, a security context with the network entity upon successful authentication based on the MSK.

15. The apparatus according to claim 14, wherein the NSWO connection to the network entity is during an extensible authentication protocol (EAP) procedure and wherein the UE identifier serves as a fifth generation core (5GC) credential used in the NSWO connection.

16. The apparatus according to claim 14, wherein the UE identifier is used for regular 3rd generation partnership project (3GPP) access or non-3GPP access to a fifth generation core (5GC).

17. An apparatus comprising:

at least one processor; and at least one memory including computer program code, the at least one memory and the computer program code configured to, with the at least one processor, cause the apparatus to at least:

receive, by a network function, from a network entity, a user equipment (UE) identifier; cause transmission, by the network function, to an authentication function, of the UE identifier and a wireless connection indicator, wherein the wireless connection indicator indicates that an extensible authentication protocol (EAP) procedure is triggered for non-seamless wireless offload (NSWO) connection purposes; and upon successful authentication using the UE identifier, send a master key received from the authentication function to the network entity.

18. The apparatus according to claim 17, wherein the at least one memory and the computer program code are further configured to, with the at least one processor, cause the apparatus, upon successful authentication using the UE identifier, to store, by the network function, a permanent UE identifier received from the authentication function, and wherein the permanent UE identifier is a subscription permanent identifier (SUPI) derived from the UE identifier.

19. The apparatus according to claim 17, wherein the authentication function is configured to determine an authentication type using the wireless connection indicator and trigger the extensible authentication protocol (EAP) procedure for the NSWO connection purposes in accordance with the authentication type.

20. The apparatus according to claim 17 wherein the at least one memory and the computer program code are further configured to, with the at least one processor, cause the apparatus to at least:

cause transmission, by the network function, to a unified data management (UDM), of a registration request message for registering a UE; and upon receiving, at the network function, from the UDM, a deregistration message for deregistering the UE, trigger a termination of the wireless connection to the network entity.

21. The apparatus according to claim 17, wherein the at least one memory and the computer program code are further configured to, with the at least one processor, cause the apparatus to at least:

receive, at the network function, the master key and a subscription permanent identifier (SUPI), wherein the master key is established as a result of a key derivation process based on, at least in part, a serving network name provided by the network function.

22. The apparatus according to claim 17, wherein the network function is configured to be used as an access and mobility management function (AMF) proxy towards an authentication server function (AUSF) in a fifth generation core (5GC) and as an authentication, authorization, and accounting (AAA) proxy towards the wireless connection.

23. The apparatus according to claim 17, wherein the UE identifier is a subscription concealed identifier (SUCI).

24. The apparatus according to claim 17, wherein the UE identifier serves as a fifth generation core (5GC) credential used in a NSWO connection.

* * * * *